UNITED STATES PATENT OFFICE.

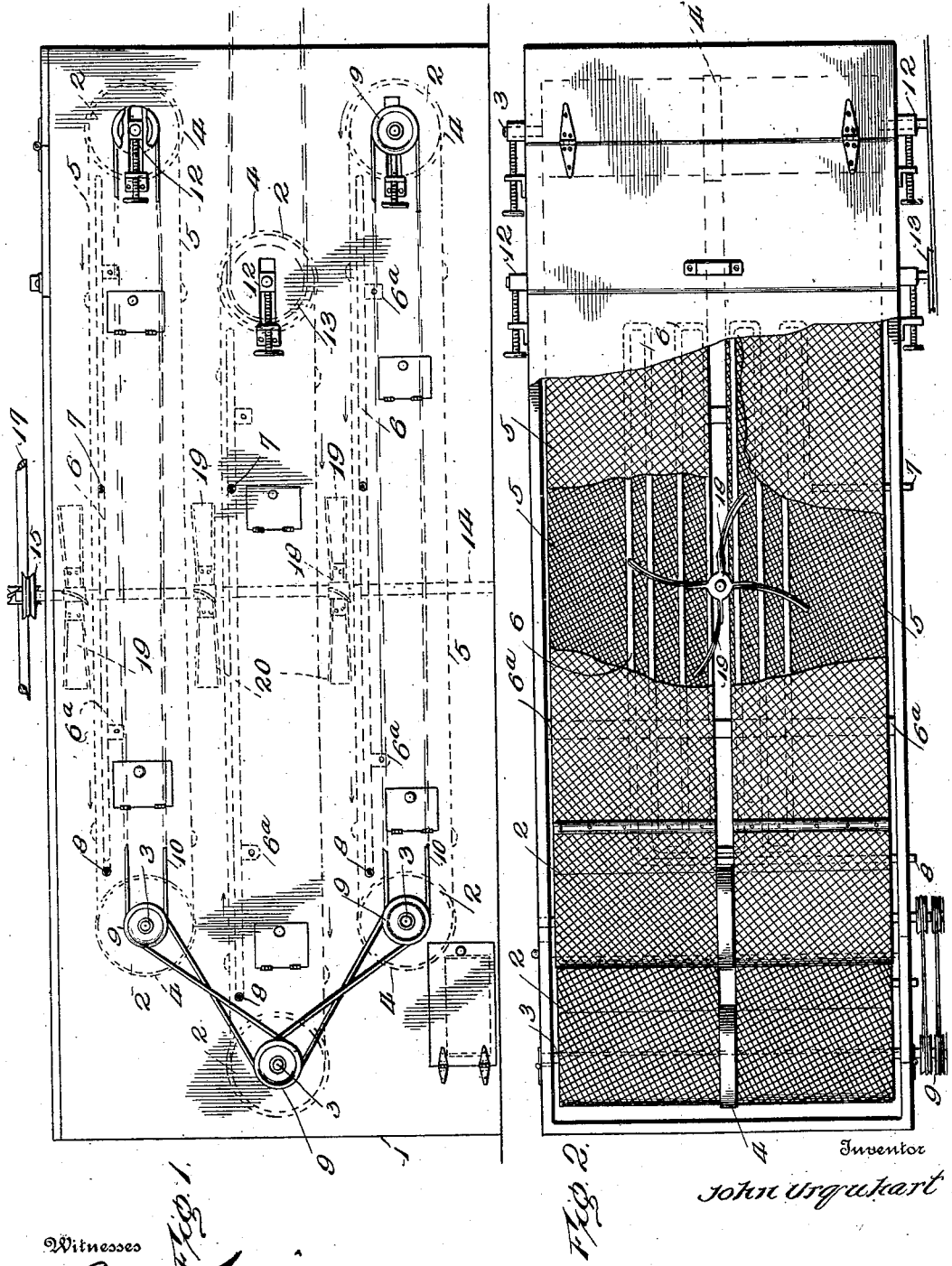

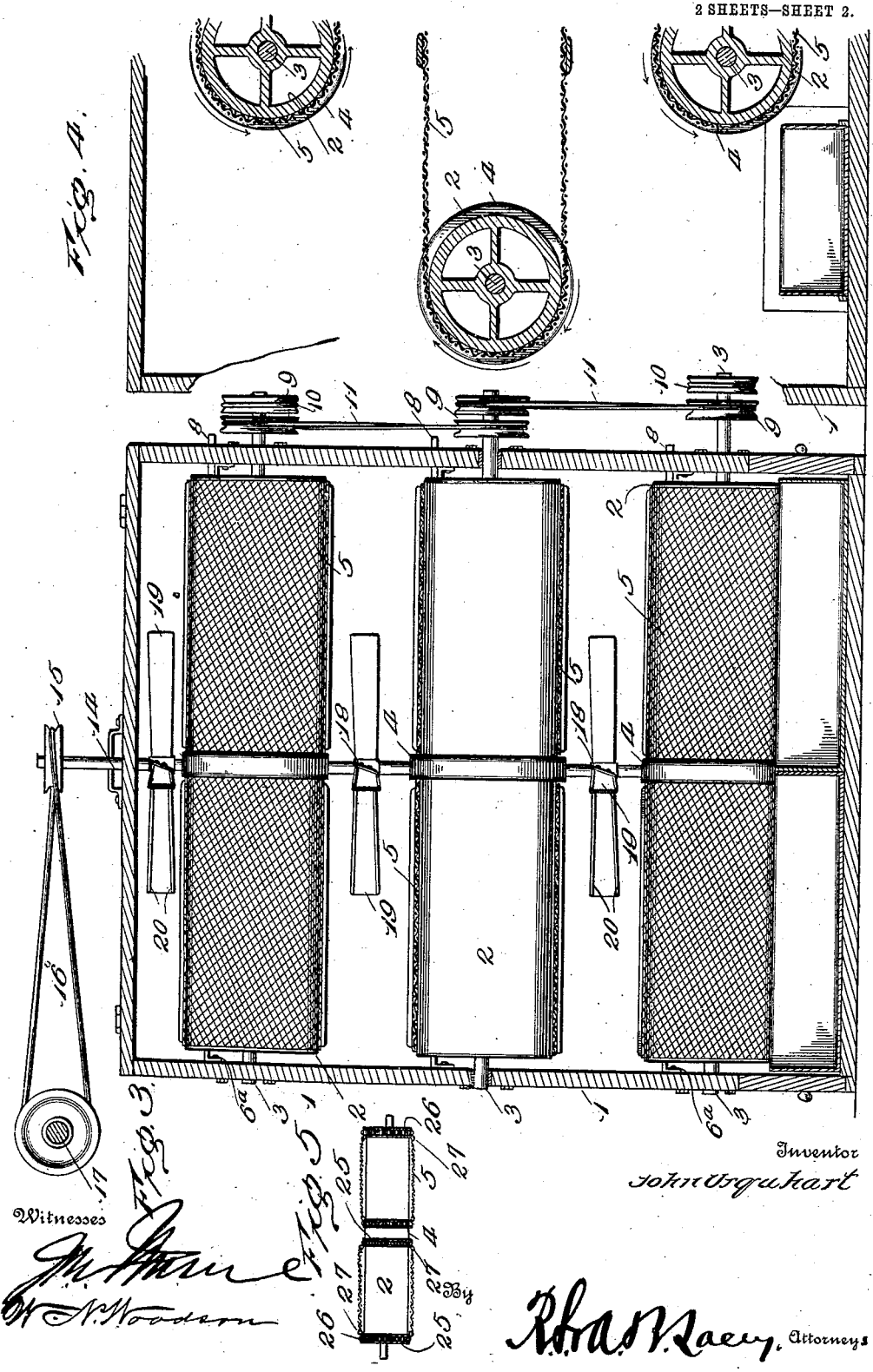

JOHN URQUHART, OF MONTEREY, CALIFORNIA.

FISH-DRYING APPARATUS.

No. 886,094.  Specification of Letters Patent.  Patented April 28, 1908.

Application filed July 11, 1907. Serial No. 383,332.

*To all whom it may concern:*

Be it known that I, JOHN URQUHART, resident of the United States, residing at Monterey, in the county of Monterey and State of California, have invented certain new and useful Improvements in Fish-Drying Apparatus, of which the following is a specification.

This invention contemplates certain new and useful improvements in fish drying apparatus and the invention has for its object a simple, durable and efficient construction of device or apparatus of this character which will operate on a continuous principle and effectually dry the fish in proper condition for further processing, such as preparing in oil, or the like, or for any other purposes.

The invention consists in certain constructions, arrangements and combinations of the parts which will be hereinafter described and pointed out in the appended claims.

For a full understanding of the invention and the merits thereof and also to acquire a knowledge of the details of construction of the means for effecting the result, reference is to be had to the following description and accompanying drawings, in which:

Figure 1 is a side elevation; Fig. 2 is a top plan view, portion of the cover being removed; Fig. 3 is a vertical sectional view; Fig. 4 is a detail longitudinal sectional view, taken through one end of the frame; and, Fig. 5 is a detail view illustrating parts hereinafter specifically referred to.

Corresponding and like parts are referred to in the following description and indicated in all the views of the drawings by the same reference characters.

My improved fish drying apparatus comprises a box or casing 1 of any desired width, length and height, and of any desired material, such as wood, the entire casing being preferably tightly closed, except for the provision of doors in the top, side or either end for the purpose of regulating the heat and for the further purpose, as regards some of the doors, of admitting fish into the casing and removing them therefrom.

Within the casing 1 are any desired number of rollers 2 mounted in superposed series with a pair to each series, three sets or pairs of rollers being shown in the present instance, one pair above the other with spaces between. The several rollers 2 have their shafts 3 projected out through the side walls of the casing, and within the casing, each roller is provided, preferably at its middle with a disk or head 4 which practically divides the roller into two equal parts.

Wire netting 5 or similar foraminous or reticulated material is passed tightly around the several rollers of each pair in two distinct strips as regards the two halves of the rollers, so as to produce two endless conveyers for each pair of rollers. The fish are deposited in the top of the casing upon the endless conveyers 5 of the uppermost series of rollers and carried throughout the full length of the casing and thence dropped to the next pair of endless conveyers and so on, down to the bottom of the casing where they are deposited in a pan or other receptacle and carried off in baskets or the like for further processing.

In order to thoroughly dry the fish as they pass slowly along from one pair of endless conveyers to the other, I have provided heating coils 6 for each pair of conveyers, said coils being provided with inlet pipes 7 by which they may be fed from an individual or common supply pipe designed to furnish steam or hot air, and the several coils are also provided with outlet or exhaust pipes 8 which may also lead to a common exhaust. The several coils 5 are in juxtaposition to the conveyer and beneath the upper stretches thereof, as clearly illustrated in the drawing, so that they will effectively heat and dry with upwardly traveling air currents the fish as they pass continuously through the casing. The coils may be supported within the casing by means of transverse rods 6ª.

In order to drive the several rollers and endless conveyers or aprons, the shafts of the respective rollers are provided with pulleys 9 connected together by belts or bands 10, the rollers of the several pairs being also connected together for a simultaneous though reverse movement by means of the twisted belts 11.

In order that the wire netting or other endless conveyers may be kept taut and any slack taken up, one shaft of each pair of rollers is preferably mounted in adjustable journal boxes 12, as clearly illustrated in the drawing.

13 designates the main drive wheel for the rollers and their conveyers, said wheel being preferably mounted upon the shaft of one of the intermediate rollers.

In order to diffuse the upwardly moving currents of heated air from the coils over the surface of the conveyers, so that the fish throughout the entire area of the conveyers may be uniformly heated and dried, I mount a vertical shaft 14 within the casing, in suitable bearings, in the spaces between the two conveyers of each pair, said shaft being rotated by means of a pulley 15 and belt 16 from a main driving shaft 17. This shaft 14 carries a series of fans which may be of any desired construction or material and which, in the present instance, as shown, are constructed of cast wings 18 secured to the shaft and provided with galvanized iron blades 19 reinforced by radial strips 20. These blades are curved or twisted axially as clearly illustrated in the drawing, so as to establish currents of air downwardly upon the surfaces of the conveyers below them, as well as in an outward direction.

From the foregoing description in connection with the accompanying drawings, it will be seen that I have provided a very simple, durable and efficient construction of fish drying apparatus which will dry the fish in a uniform manner and with a continuous operation which will avoid cooking the flesh of the fish, which would manifestly destroy the same, or render them useless for further processing.

While I have described my invention as designed for drying fish, it is obvious that it is equally applicable for drying various other products.

As illustrated in Fig. 5, each roller may be provided with sprocket wheels 26 and sprocket chains 25 may run from roller to roller the full length of the drier. The sides of the wire screens forming the aprons may be fastened to the sprocket chains by any suitable fastening device 27. This construction will keep the wire screens from sagging between the rollers.

Having thus described the invention, what is claimed as new is:

1. A continuous drying apparatus for the purpose set forth, comprising a casing, an endless conveyer mounted within the casing, means for actuating said conveyer, a heating coil mounted within the casing contiguous to the conveyer and underneath the uppermost stretch thereof, and adapted to produce currents of heated air passing upwardly through the conveyer, a fan mounted within the casing above the coil and conveyer, and means for rotating said fan whereby the upwardly moving currents of heated air from the coil through the conveyer will be spread over the upper surface of the conveyer.

2. A drying apparatus for the purpose set forth, comprising a casing, an endless conveyer mounted within the casing and embodying a pair of horizontally alined rollers and foraminous material stretched around the same, the said material being constructed in two lengths and each roller being provided intermediate of its ends with a head dividing it into two parts, the respective lengths of foraminous material being located on opposite sides of the heads of the respective rollers, a vertical shaft mounted to rotate in the casing and in the space formed by the said heads and lengths of foraminous material, a fan mounted on said shaft, means for rotating said shaft, means for actuating said conveyer, and a heating coil mounted within the casing below the upper stretch of the conveyer, whereby the upwardly traveling currents of heated air passing through the conveyer will be distributed over the upper surface thereof by the fan.

In testimony whereof I affix my signature in presence of two witnesses.

JOHN URQUHART. [L. s.]

Witnesses:
F. S. BERRY,
A. E. GRANINI.